J. F. O'CONNOR.
FRICTION DRAFT RIGGING.
APPLICATION FILED AUG. 4, 1909.
1,080,922.
Patented Dec. 9, 1913.
2 SHEETS—SHEET 2.
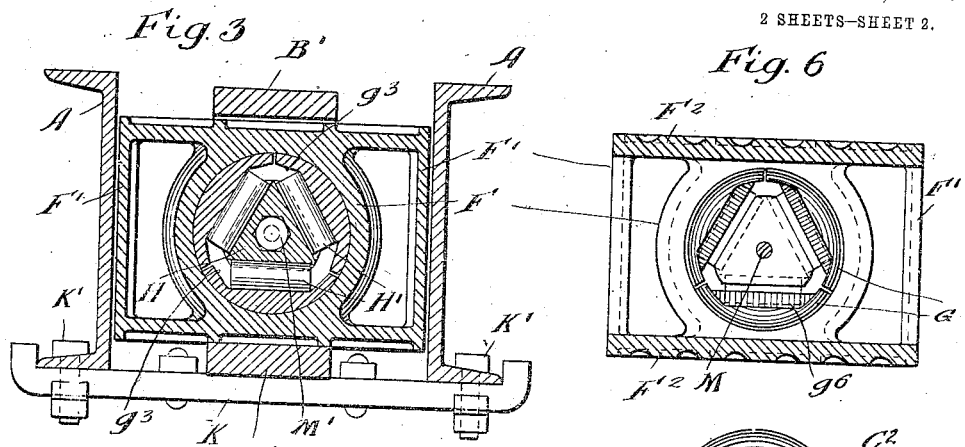
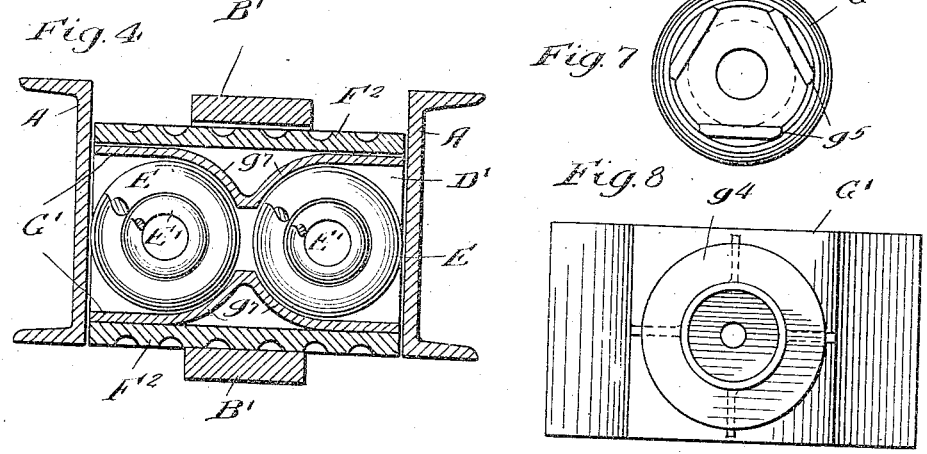
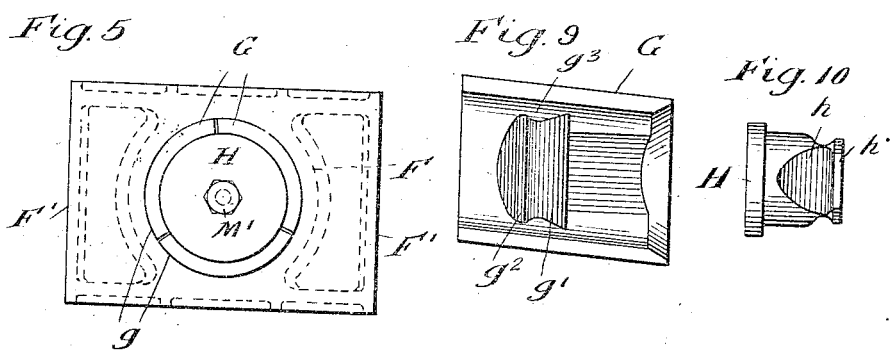
Witnesses:
Wm Geiger
H. W. Munday
Inventor.
John F. O'Connor
By Munday, Evarts, Adcock & Clarke.
Attorneys

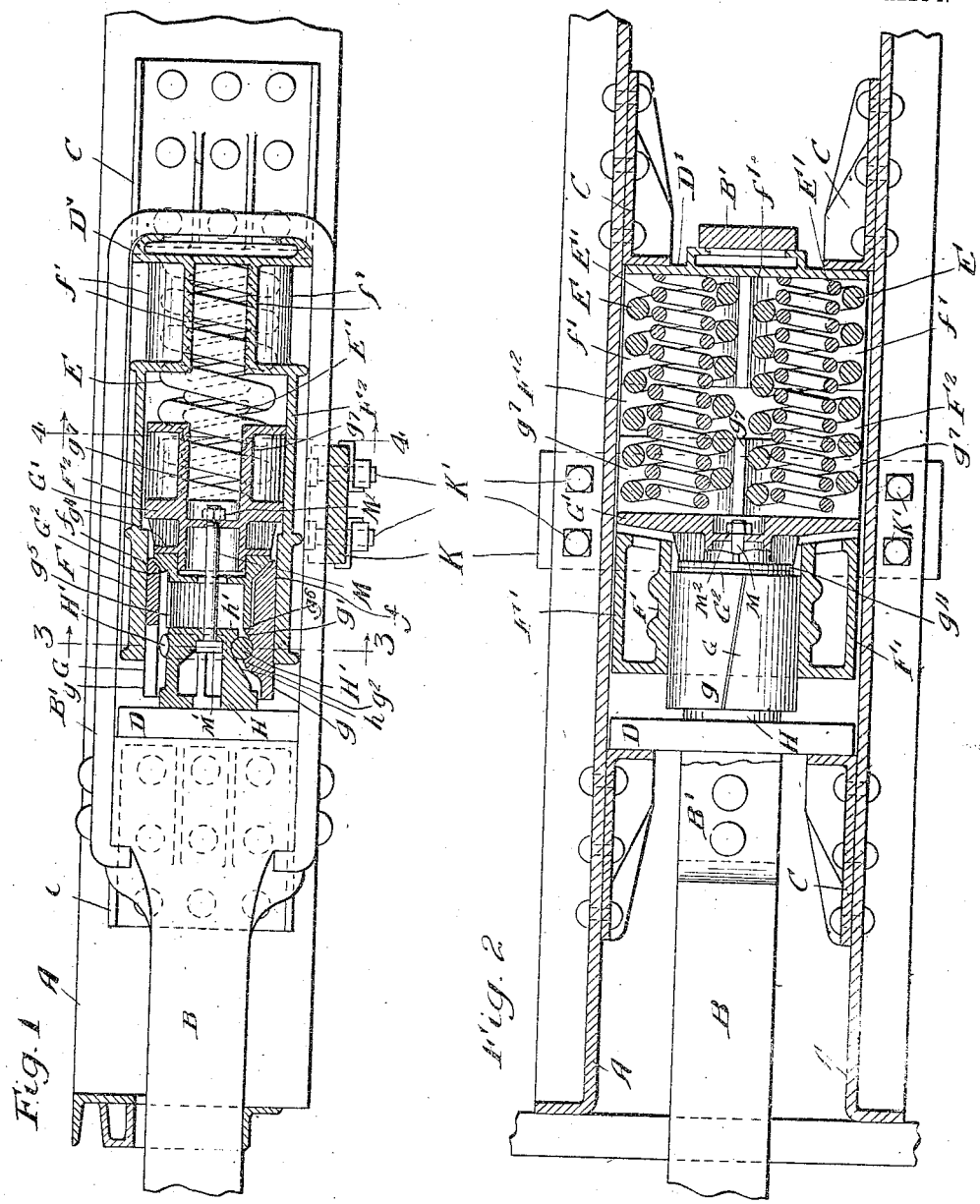

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING.

1,080,922.   Specification of Letters Patent.   Patented Dec. 9, 1913.

Application filed August 4, 1909. Serial No. 511,082.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging.

The object of my invention is to provide a friction draft rigging of a simple, efficient and durable construction, which will have a high total cushioning capacity, and in which the spring portion of the total cushioning capacity will be relatively great (double that in the ordinary constructions of friction draft rigging), and the friction portion of the total cushioning capacity will be relatively small in order that the wear of the friction devices may be lessened, the durability of the draft rigging as a whole correspondingly increased and the efficiency of the draft rigging also greatly improved both in respect to its cushioning action and also in respect to certainty and reliability of release action after each cushioning movement or blow.

To practically accomplish this object or result, and herein my invention consists, I combine with the draw-bar, draft yoke and stop members, and a single friction cushioning unit or mechanism, two parallel or twin arranged and simultaneously acting springs, the friction cushioning devices being directly in line with the draw-bar and the two twin or parallel springs being at the end, and one at each side of the axis of the friction devices.

My invention further consists in the novel construction of parts and devices and in the novel combinations of parts and devices herein shown and described and more particularly set forth in the claims.

In the accompanying drawing forming a part of this specification, Figure 1 is a side elevation, partly in longitudinal section, of a friction draft rigging embodying my invention. Fig. 2 is a plan view, partly in horizontal section. Figs. 3 and 4 are detail cross sections on lines 3—3 and 4—4 of Fig. 1 respectively. Fig. 5 is a front end view of the friction shell and its parts. Fig. 6 is a detail cross sectional view of the friction shell, showing certain parts in elevation. Fig. 7 is a detail view of the central bearing cap through which the pressure of the springs is transmitted to the friction shoes. Fig. 8 is a detail view of the twin spring follower against which the twin springs directly act and through which their pressure is transmitted to the central bearing cap and friction shoes. Fig. 9 is a detail inside plan view of one of the friction shoes and Fig. 10 is a detail view of the wedge.

In the drawing, A represents the draft sills or members of the car frame to which the draft rigging is applied, the same being preferably rolled steel center sills, B the draw-bar, $B^1$ the draft yoke, C the draft lugs or stop members secured to the draft sills, D the front follower, $D^1$ the rear follower, preferably formed integral with the friction shell, E E twin or parallel arranged springs, each preferably having a smaller spring $E^1$ inside the same, F a longitudinally movable friction shell, G segmental friction shoes within the shell, H a wedge and $H^1$ anti-friction rollers interposed between the wedge and friction shoes.

The friction shell F has an internal cylindric friction face $f$, in sliding frictional contact with the external friction faces $g$ of the segmental friction shoes G, which are preferably three in number, and each furnished with an inclined or wedge face $g^1$ parallel to and coöperating with one of the inclined faces $h$ of the wedge H, which is likewise preferably three-faced or pyramidal. The friction shoes G have seats or shoulders $g^2$ coöperating with corresponding shoulders $h^1$ on the wedge H to keep the rollers in place; the shoes G having further shoulders $g^3$ to keep the rollers in place lengthwise. The friction shell F is preferably provided with lateral extensions or guide members $F^1$, preferably formed integral therewith to cause it to properly fit between and be guided by the upright webs of the draft sills and giving the friction shell externally a general rectangular shape. The friction shell is also provided with upper and lower longitudinal extensions $F^2$, preferably formed integral therewith, and also preferably integral with the rear follower $D^1$.

$G^1$ is an intermediate or supplemental twin spring follower interposed between the front ends of the twin springs E E and the rear ends of the friction shoes G, and against which the front ends of the springs directly act, this intermediate or supplemental follower being provided with a central projecting bearing $g^4$ to receive and act against the supplemental central cap or bearing member $G^2$ which is provided with wings or extensions $g^5$ which act against the central bearing shoulders $g^6$ of the friction shoes G. By means of this intermediate twin spring follower $G^1$ against which the twin or parallel springs act, one on each side of the central longitudinal line of the draw-bar and the central bearing cap $G^2$ which acts centrally against the several friction shoes, the pressure or tension of the twin or parallel springs E E is transmitted equally and centrally to the several friction shoes.

The anti-friction rollers $H^1$ bear against the central or middle portion of the friction shoes G and serve in connection with the wedge H to transmit the pressure of the draw-bar centrally against the friction shoes, thus insuring proper bearing of the shoes against the shell from end to end. And as the friction shoes G also have on their inner faces central bearing shoulders $g^6$ against which the central supplemental bearing cap $G^2$ acts, the thrust or pressure of the twin springs E E is also transmitted centrally to the friction shoes.

The upper and lower integral longitudinal extensions $F^2$ of the externally rectangular and internally cylindric friction shell F are preferably furnished at their rear portions with curved stiffening walls $f^1$ which fit between and partially embrace the twin springs E E. And the twin spring follower $G^1$ is preferably furnished with cylindrically curved walls $g^7$ forming laterally open pockets to receive and partially surround the springs.

K is a removable tie-plate or guide which is secured to the draft sills by bolts $k$ and which supports the draft rigging.

M is a connecting rod having a head $M^1$ at one end acting against the wedge H and a threaded nut $K^2$ at the other end, which bears against the twin spring follower $G^1$.

I claim:—

1. In a friction draft rigging, the combination with a draw-bar, draft yoke and stop members, of a friction cushioning mechanism comprising a friction shell and friction shoes, two parallel simultaneously acting springs, a twin spring follower between the springs and the friction shoes, and a central bearing cap interposed between said twin spring follower and said friction shoes, substantially as specified.

2. In a friction draft rigging, the combination with a draw-bar, draft yoke and stop members, of a front follower, an externally rectangular friction shell having a central cylindric friction face, a rear follower integral with said friction shell, longitudinal extensions integrally connecting said friction shell and rear follower, said extensions being provided at the rear portion thereof with curved stiffening walls adapted to partially embrace twin springs, friction shoes within the shell and simultaneously acting twin springs, substantially as specified.

3. In a friction draft rigging, the combination with a draw-bar, draft yoke and stop members, of a front follower, an externally rectangular friction shell having a central cylindric friction face, a rear follower integral with said friction shell, longitudinal extensions integrally connecting said friction shell and rear follower, said extensions being provided at the rear portion thereof with curved stiffening walls adapted to partially embrace twin springs, friction shoes within the shell and simultaneously acting twin springs, and a twin spring follower interposed between the springs and friction shoes and having laterally open curved pockets to receive and partially embrace the twin springs, and a central bearing cap between said friction shoes and said twin spring follower, substantially as specified.

JOHN F. O'CONNOR.

Witnesses:
H. M. MUNDAY,
PEARL ABRAMS.